United States Patent [19]

Giza

[11] Patent Number: 4,929,407

[45] Date of Patent: May 29, 1990

[54] PROCESS OF MAKING A GOLF BALL COVER

[75] Inventor: John Giza, Acushnet, Mass.

[73] Assignee: Acushnet Company, New Bedford, Mass.

[21] Appl. No.: 280,565

[22] Filed: Dec. 6, 1988

[51] Int. Cl.$^5$ .................. B29C 33/10; B29C 43/56; B29C 45/63
[52] U.S. Cl. .................. 264/101; 264/250; 264/320; 264/328.1; 264/331.18; 264/DIG. 78; 425/203; 425/812; 425/DIG. 60; 528/481; 528/501
[58] Field of Search .............. 264/101, 102, 248, 250, 264/257, 279.1, 320, 328.1, 331.18, DIG. 78; 425/203, 812, DIG. 60; 156/228, 245; 528/481, 501

[56] References Cited

U.S. PATENT DOCUMENTS

| | | | |
|---|---|---|---|
| 3,264,272 | 8/1966 | Rees | 428/36.9 |
| 3,454,280 | 7/1969 | Harrison et al. | 273/235 R |
| 3,819,768 | 6/1974 | Molitor | 273/235 R |
| 4,557,852 | 12/1985 | Schulz et al. | 252/95 |
| 4,797,221 | 1/1989 | Gueldenzopf | 252/95 |

*Primary Examiner*—Jeffery Thurlow
*Assistant Examiner*—Leo B. Tentoni
*Attorney, Agent, or Firm*—Lucas & Just

[57] ABSTRACT

The process uses a vented barrel to decrease the moisture content of the ionomeric resin cover stock prior to injection molding of a golf ball cover or the formation of semi-circular cover halves. The vent is located at a point on the barrel where the temperature of the melted ionomeric resin melt is between 400° F. (204° C.) and 500° F. (260° C.). The venting drops the moisture content of the ionomeric resin to below 800 ppm.

18 Claims, 1 Drawing Sheet

PROCESS OF MAKING A GOLF BALL COVER

This invention relates to golf balls and more specifically to an improved process for making SURLYN® covered golf balls.

BACKGROUND OF THE INVENTION

Two-piece and wound golf balls are made by molding a cover about a core. The core of a wound golf ball is either a liquid filled or solid center around which elastic thread has been wound. The core of a two-piece golf ball is a solid ball of material around which a cover is molded. Cores, of both the wound and two-piece golf ball, typically measure 1.4 to 1.6 inches (3.6 to 4.1 cm.) in diameter. The cover is molded about the core to produce a golf ball with the minimum United States Golf Association (USGA) diameter of 1.68 inches (4.27 cm.). So-called "British" golf balls are made in the same manner except the core size is typically between 1.35 to 1.55 inches (3.43 to 3.94 cm.) and have an overall minimum diameter of 1.62 inches (4.11 cm.).

Balata and SURLYN® are generally used as cover material. SURLYN® was discovered in the middle 1960's by DuPont and has been adopted by the golf ball industry for use as a cover composition because of its good cut resistance and ready availability. SURLYN® is a trademark for a group of ionomeric resins. U.S. Pat. No. 3,264,272 dated Aug. 2, 1968 teaches a wide variety of ionomeric resins and U.S. Pat. No. 3,454,280 dated July 8, 1969 teaches the use of SURLYN® as a cover material for golf balls. U.S. Pat. No. 3,819,768 dated June 25, 1974 alleges that a blend of sodium and zinc SURLYN® produces a more durable cover on a golf ball than a single SURLYN®. These ionomeric resins are copolymers of an olefin and an alpha, beta ethylenically unsaturated carboxylic acid with 10–90% of the carboxylic groups being neutralized by metal ions. Commercially, these ionomeric resins are available only as copolymers of ethylene and methacrylic or acrylic acid, wherein the acid groups are neutralized by sodium, zinc or lithium ions. The commercially available isomeric resins differ primarily in the quantities of each of the ingredients (ethylene, unsaturated acid and metal ions) present.

Golf ball covers are molded about a core in one of two ways, either by compression molding two hollow, semi-circular cover halves about a core or by injection molding cover stock around core. The molding of two semi-circular cover halves around a core is conventional and is generally accomplished by means of a frame containing a plurality of paired ball cup molds. Each ball cup mold bears a dimple pattern which is implanted on the cover halves when the frame is closed and the cover halves are subjected to heat and pressure. The heat and pressure cause the cover halves to join and form a solid, dimpled cover.

The semi-circular cover halves are formed in a conventional molding operation using a mandrel and a cup shaped mold half. The SURLYN® is injected into a closed cavity formed between the mandrel and the cup shaped mold half. Once the half shell hardens, the closed cavity is opened and the semi-circular cover half removed.

Injection molding of golf ball covers is accomplished in a conventional manner by placing cores inside retractable pin ball cup molds and injecting cover stock around the core. Generally the ball cup molds are housed in a frame.

Prior to molding the cover of a golf ball by injection molding or forming the semi-circular cover halves, the pellets of SURLYN® along with other materials which make up the SURLYN® cover stock material are placed in a hopper which feeds a heated barrel having a screw therein. The screw forces the SURLYN® cover stock through the barrel while the heat softens the SURLYN® into a fluid state.

A problem faced by golf ball manufacturers is water contamination in the SURLYN® cover stock. SURLYN® is very hygroscopic. In order to prevent the SURLYN® from picking up water, SURLYN® is sold in special containers. Golf ball manufacturers are required to buy a special "dry" SURLYN® from the producer of SURLYN® in order to get an acceptable starting material.

These special containers do not always prevent the SURLYN® from hydrating. When the moisture level of the SURLYN® increases beyond 2,000 ppm, the melt flow becomes unstable and the dyes added to cover stock for purposes of coloring the golf ball yield poor results. The instability with the color is especially true with orange colored golf balls.

SUMMARY OF THE INVENTION

Applicant has now discovered that by flashing the melted SURLYN® cover stock prior to forming the semi-circular cover halves or injection molding the cover stock about a core that the moisture level of the SURLYN® is lowered to an acceptable level and the melt flow and color are stabilized. This flash step is accomplished on the SURLYN® cover stock material which is typically over 90% by weight SURLYN® and preferably at least about 95% by weight. Additional materials which may be included in the cover stock material include titanium dioxide, dyes, UV absorbers and other known additives.

DESCRIPTION OF THE PREFERRED EMBODIMENTS

Figure 1:
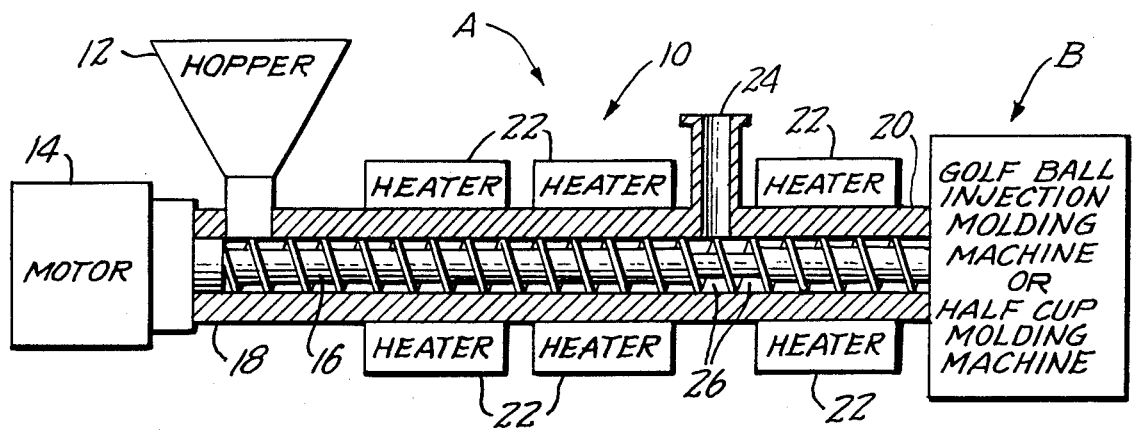
FIG. 1 illustrates an apparatus for accomplishing the present invention.

FIG. 1 illustrates extruder A attached to golf ball injection molding machine or half cup molding machine B. Extruder A comprises barrel 10 which is fed pellets of SURLYN® cover stock material by hopper 12. Gravity causes the pellets to fall into barrel 10. Motor 14 drives screw 16 causing pellets to move from feed end 18 of barrel 10 to melt end 20. Melt end 20 of barrel 10 is connected to either a golf ball injection molding machine or a half cup molding machine B as shown. Barrel 10 is equipped with heaters 22 that cause the pellets to melt and form a fluid. Vent 24 is positioned towards melt end 20 of barrel 10 as shown in FIG. 1. Vent 24 provides a channel from inside barrel 10 to outside barrel 10 and allows for moisture in the SURLYN® cover stock material to escape.

When the melted SURLYN® cover stock material comes into contact with the low pressure zone created by vent 24, the drop in pressure causes the water contained in the melted SURLYN® cover stock material to flash off.

Preferably vent 24 is positioned on barrel 10 at a point where the SURLYN ® melt has a temperature above about 400° F. (204° C.) and more preferably at a point on the barrel where the SURLYN ® cover stock material has a temperature between about 400° F. (204° C.) to about 500° F. (260° C.).

Figure 2:
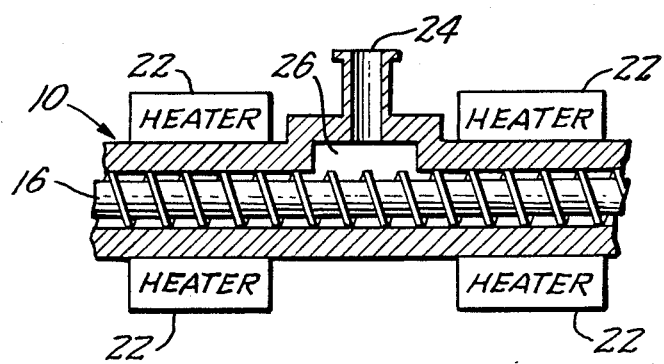
FIG. 2 illustrates another apparatus for accomplishing the present invention.

Chamber 26 is preferably positioned under vent 24 which is only partially filled with SURLYN ® melt. As shown in FIG. 1, chamber 26 is created by decreasing the diameter of the axis of screw 16. Alternatively, chamber 26 is created by increasing the inner diameter of barrel 10 as shown in FIG. 2.

The pressure in chamber 26 is preferably about atmospheric however below atmospheric pressure can be used. This allows chamber 26 to act as a flash chamber which allows moisture to be driven off of the SURLYN ® melt.

It has been found that by using the vented barrel of FIG. 1 wherein the vent is to the atmosphere and is positioned on barrel 10 at a point where the melt has a temperature between about 400° F. (204° C.) to about 500° F. (260° C.) that the SURLYN ® in hopper 12 having a moisture content of 9,000 ppm has a moisture below about 800 ppm after it has passed through chamber 26. Preferably, the moisture of SURLYN ® cover stock material is dropped below about 900 ppm and more preferably below about 800 ppm.

The barrel used to heat the SURLYN ® cover stock material has a length to diameter ratio of between about 30:1 to 18:1 and good results have been found using a length to diameter ratio of 20:1.

FIG. 1 and 2 show only one vent 24 in barrel 10. Clearly, a plurality of vents can be used so long as they are positioned in accordance with the teachings of this disclosure.

It will be understood that the claims are intended to cover all changes and modifications of the preferred embodiments of the invention, herein chosen for the purpose of illustration, which do not constitute departures from the spirit and scope of the invention.

What is claimed is:

1. In a method for forming a golf ball cover from an ionomeric resin cover stock comprising an ionomeric resin of a copolymer of an olefin and an alpha, beta ethylenically unsaturated carboxylic acid with 10-90% of the carboxylic groups being neutralized by metal ions by subjecting said ionomeric resin cover stock to heating, venting and forming into a golf ball cover, the improvement comprising:
   (a) heating said ionomeric resin cover stock to form a melted ionomeric resin cover stock; and
   (b) flashing said melted ionomeric resin cover stock at a temperature above about 400° F. (204° C.) in a vented barrel to release moisture from said melted ionomeric resin cover stock thereby reducing the moisture of said melted ionomeric resin cover stock to below about 900 ppm.

2. The method of claim 1 wherein said ionomeric resin cover stock is flashed at a temperature between about 400° F. (204° C.) to about 500° F. (260° C.).

3. The method of claim 1 wherein the cover stock is flashed at atmospheric pressure.

4. The method of claim 1 wherein the ionomeric resin is a copolymer of ethylene and acrylic acid neutralized by at least one of the metal ions selected from the group consisting of sodium, zinc and lithium.

5. The method of claim 1 wherein the ionomeric resin cover stock further comprises titanium dioxide, dye and UV absorbers.

6. A method for reducing the moisture content of an ionomeric resin comprising:
   (a) melting an ionomeric resin of a copolymer of an olefin and an alpha, beta ethylenically unsaturated carboxylic acid with 10-90% of the carboxylic groups being neutralized by a metal ion to produce a fluid ionomeric resin; and
   (b) flashing said fluid ionomeric resin at a temperature above about 400° F. (204° C.) in a vented barrel to release moisture from said fluid ionomeric resin to reduce the moisture content of said fluid ionomeric resin to below about 900 ppm.

7. The method of claim 6 wherein the fluid ionomeric resin is flashed at a temperature between about 400° F. (204° C.) to about 500° F. (260° C.).

8. The method of claim 6 wherein the fluid ionomeric resin is flashed at atmospheric pressure.

9. A method for making a golf ball half cup in a half-cup molding machine comprising:
   (a) melting an ionomeric resin cover stock comprising a copolymer of an olefin and an alpha, beta ethylenically unsaturated carboxylic acid with 10-90% of the carboxylic groups being neutralized by a metal ion to produce a fluid ionomeric resin cover stock;
   (b) flashing said fluid ionomeric resin cover stock at a temperature above about 400° F. (204° C.) in a vented barrel to release moisture from said fluid ionomeric resin cover stock to reduce the moisture content of said fluid ionomeric resin cover stock to below about 900 ppm; and
   (c) molding a semi-circular cover half using a mandrel and a cup-shaped mold half in a half-cup molding machine.

10. The method of claim 9 wherein the fluid ionomeric resin cover stock is flashed at a temperature between about 400° F. (204° C.) to about 500° F. (260° C.).

11. The method of claim 9 wherein the fluid ionomeric resin cover stock is flashed at atmospheric pressure.

12. A method for forming a golf ball in an injection molding machine comprising:
   (a) melting an ionomeric resin cover stock comprising a copolymer of an olefin and an alpha, beta ethylenically unsaturated carboxylic acid with 10-90% of the carboxylic groups being neutralized by a metal ion to produce a fluid ionomeric resin cover stock;
   (b) flashing said fluid ionomeric resin cover stock at a temperature above about 400° F. (204° C. ) in a vented barrel to release moisture from said fluid ionomeric resin cover stock to reduce the moisture content of said fluid ionomeric resin cover stock to below about 900 ppm; and
   (c) molding a cover about a core held in a retractable-pin ball cup mold of a golf ball injection molding machine.

13. The method of claim 12 wherein the fluid ionomeric resin cover stock is flashed at a temperature between about 400° F. (204° C.) to about 500° F. (260° C.).

14. The method of claim 12 wherein the fluid ionomeric resin cover stock is flashed at atmospheric pressure.

15. The method of claim 1 wherein said vented barrel has a length to diameter ratio of about 20:1.

16. The method of claim 6 wherein said vented barrel has a length to diameter ratio of about 20:1.

17. The method of claim 9 wherein said vented barrel has a length to diameter ratio of about 20:1.

18. The method of claim 12 wherein said vented barrel has a length to diameter ratio of about 20:1.

* * * * *